United States Patent Office 3,267,134
Patented August 16, 1966

3,267,134
GLYCOL ESTERS OF DIFLUORONITROACETIC ACID
Eugene R. Bissell, Alamo, Calif., assignor to the United States of America as represented by the United States Atomic Energy Commission
No Drawing. Filed Mar. 9, 1965, Ser. No. 438,434
7 Claims. (Cl. 260—487)

The invention described herein was made in the course of, or under, a contract with the U.S. Atomic Energy Commission.

The present application is a continuation-in-part application of my copending application entitled Diesters of Difluoronitroacetic Acid, S.N. 281,372 filed May 17, 1963, now abandoned.

This invention relates to aliphatic esters and, in particular, to the substituted and unsubstituted glycol esters of difluoronitroacetic acid and to a method for the preparation thereof.

Plastic bonded explosives (hereinafter referred to as PBX) find wide utility in both civilian and military applications. A typical PBX will frequently contain a suitable plasticizer which confers a degree of plasticity to the explosive, thereby enabling it to withstand mechanical shock without cracking. A plasticizer suitable for incorporation into a PBX should have the following: (1) high boiling point; (2) liquid over a wide temperature range; (3) contribution to the explosive energy of the PBX. A high boiling point is necessary to prevent undue loss of plasticizer by evaporation. The plasticizer must be a liquid over a wide temperature range in order to prevent plasticizer phase changes from occurring within the operational temperature range of the PBX, thereby causing cracking and deformation of the explosive. It is desirable that the plasticizer itself contribute to the explosive energy of the PBX, otherwise the plasticizer would be merely an inert diluent ingredient in the explosive formulation.

The present invention provides a new series of compounds suitable for use as PBX plasticizers, and a method for the preparation of such compounds. In addition to their use as plasticizers, the compounds can also be used as vehicles in liquid explosive formulations.

The compounds of the invention are the glycol esters of difluoronitroacetic acid, having the structural formula

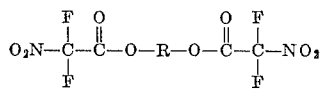

where R comprising the organic chain radical of the glycol portion of the present ester compounds is an alkylene group, which may be either straight chain or branched chain, substituted or unsubstituted isomeric radicals having 1 to 15 carbon atoms. For the purposes of the present invention, the symbol $R_s$ will be used to denote substituted alkylene groups. Preferred substituent groups for use in explosive compositions are halogen and nitro substituents.

If a diester is to be used as a PBX plasticizer, then is is desirable that the chain length of the glycol be no longer than about 15 carbon atoms. Diesters prepared from glycols having more than 15 carbon atoms in the chain tend to have too high a melting point for use in PBX plasticizers.

The compounds of the present invention are prepared by the following classical reaction:

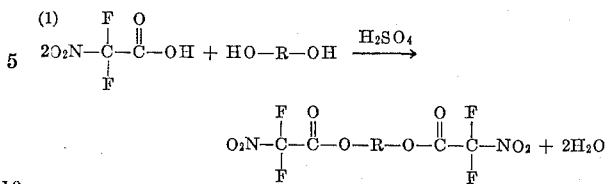

The reaction temperature is not critical, but some external cooling is necessary because of the large amount of heat evolved. The starting material, difluoronitroacetic acid, can be prepared by the method of Knunyants and Fokin, Doklady Akad. Nauk S.S.S.R., 112, 67 (1957). The preparation of the difluoronitroacetic acid esters of substituted glycols including branched chain glycols is substantially similar to the preparation of straight chain glycol diesters of difluoronitroacetic acid, the preparation of which is described in detail in my above noted copending application. Typical experimental procedures for preparing substituted glycol bis-difluoronitroacetates are given in the following illustrative examples.

EXAMPLE I.—PREPARATION OF ETHYLENE GLYCOL BIS-DIFLUORONITROACETATE 50 grams of sulfuric acid was added drop by drop to a stirred solution of 5.4 grams of ethylene glycol in 27.3 grams of difluoronitroacetic acid. The temperature of the solution was maintained at 0° C. during the addition of the sulfuric acid. The reaction mixture was stored at room temperature for 36 hours. The upper organic layer was separated, washed with water, dried over anhydrous calcium chloride, and distilled to yield ethylene glycol bis-difluoronitroacetate (B.P.: 73–75° C. at 0.5 mm. Hg).

The procedure for preparing the diesters of other glycols is similar to that given in the preceding example. If the diester is to be used in a PBX plasticizer, then it is desirable that the chain length of the glycol be no longer than about 15 carbon atoms. Diesters prepared from glycols having more than 15 carbon atoms in the chain tend to be too high melting for use in PBX plasticizers.

EXAMPLE II.—BRANCHED CHAIN DIESTERS

To prepare the diester of 1,2-propanediol 50 grams of sulfuric acid were added drop by drop to a solution containing 6.6 grams of 1,2-propanediol in 27.3 grams of difluoronitroacetic acid. Due to the large amount of heat evolved, the reaction mixture was cooled to maintain the solution at room temperature or below. The reaction mixture was then stored and the reaction allowed to proceed at room temperature for a period of about 3 days. The organic layer was then separated, washed and dried, and the diester product was purified by distillation at about 100–105° C. and .05–.01 mm. Hg. Some physical properties of glycol bis-difluoronitroacetates are given in Table I. All the diesters were prepared by the method of reaction (1). The yield values are based on percentage conversion of glycol, B.P./mm. refers to boiling point (in ° C.) at the indicated pressure (in mm. Hg), $d_{23}$ refers to density (in g./cc.) at 23° C. and $n_D{}^{25}$ refers to index of refraction at 25° C. using the sodium D line.

Table I.—*Physical Properties of Difluoronitroacetates*

| Glycol | Percent Yield | B.p./mm. | $d_{23}$ | $n_D^{25}$ | Analyses | | | | | |
|---|---|---|---|---|---|---|---|---|---|---|
| | | | | | Calculated | | | Found | | |
| | | | | | Percent C | Percent H | Percent N | Percent C | Percent H | Percent N |
| 1,2-ethanediol | 30 | 73–5/0.5 | 1.59 | 1.39380 | 23.4 | 1.3 | 9.1 | 23.2 | 1.6 | 8.3 |
| 1,2-propanediol | 40 | 79–80/0.7 (*) | 1.53 | 1.39228 | 26.1 | 1.9 | 8.7 | 26.3 | 2.3 | 8.1 |
| 1,3-propanediol | 28 | 65–6/0.1 | 1.53 | 1.39805 | 26.1 | 1.9 | 8.7 | 26.2 | 1.9 | 7.9 |
| 1,3-butanediol | 42 | (*) | 1.48 | 1.39931 | 28.6 | 2.4 | 8.3 | 29.1 | 2.2 | 7.6 |
| 1,4-butanediol | 40 | 82–3/0.2 | 1.49 | 1.40142 | 28.6 | 2.4 | 8.3 | 28.4 | 2.4 | 7.8 |
| Diethylene glycol | 28 | (*) | 1.52 | 1.40289 | 27.3 | 2.3 | 8.0 | 27.2 | 2.1 | 7.7 |

*These esters were distilled in a small molecular still at a pot temperature of 100–105° C. and a pressure of 0.05–0.1 mm.

1,2-ethanediol-bis-difluoronitroacetate is liquid in the temperature range of about −50° C. to 250° C. (at atmospheric pressure). The other esters listed in Table I exist as liquids in various ranges included between these temperatures. The remarkably wide liquid ranges of the esters insure that, when used as a PBX plasticizer, the esters will not undergo any deleterious phase changes within the operational temperature range of the PBX.

The esters listed in Table I are miscible with most oxygenated organic solvents, aromatic hydrocarbons, chloroform, methylene dichloride, and tetranitromethane. They show little or no solubility in aliphatic hydrocarbons, fluoro-carbons such as 1,1,2-trichloro-1,2,2-trifluoroethane, carbon tetrachloride, water, or sulfuric acid.

As mentioned previously, it is desirable that a PBX plasticizer should itself contribute to the explosive energy of the PBX formulation. With reference to the nitro-esters of the present invention, by virtue of their two nitro groups per molecule, they are highly energetic compounds, and will thus contribute significantly to the explosive energy of any PBX in which they are used as plasticizer.

Substituted glycols are generally converted to the diester by the same reaction given in Equation 1. Their synthesis may be carried out by essentially the same procedure for the straight chain glycols described in my above mentioned copending application S.N. 281,372 and the procedure for the synthesis of the branched chain glycols given in Example I, provided that no substituent groups are present in the α positions of the glycols radical portion which tend to adversely affect the rate or completion of the esterification reaction in accordance with known steric effects.

A group of substituted glycol diesters particularly preferred for use in explosives are those produced from fluoro substituted glycols, e.g., $$HO-CH_2-CF_2-CH_2-OH$$
$$HO-CH_2(CF_2)_2CH_2-OH$$
$$HO-CH_2-(CF_2)_3-CH_2-OH$$

For purposes of applications in explosives, fluoro-substituted glycols containing between one and about five $CF_2$ groups are found especially advantageous. These diesters are also prepared by way of the general reaction given in Equation 1.

EXAMPLE III.—FLUORO SUBSTITUTED DIESTERS

To prepare the fluoro substituted glycol diester having the structural formula

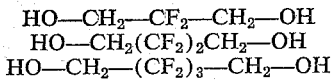

18.5 grams of the fluoro substituted glycol $$HO-CH_2(CF_2)_3CH_2OH$$

(2,2,3,3,4,4-hexafluoro-1,5-pentanediol) are mixed with about 27 grams of difluoronitroacetic acid, 50 grams of sulfuric acid is added dropwise to the reaction mixture. The temperature of the reaction mixture is kept between 30 and 50° C. and the reaction is allowed to proceed for about 30–40 hours. The product is recovered by separation and distillation as above.

Another group of compounds having particularly desirable properties for use in explosives compositions are the diesters of difluoronitroacetic and nitro-substituted glycols, e.g.,

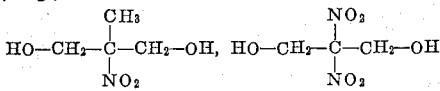

and stable nitro substituted glycols of greater chain length up to 15 carbon atoms. The synthesis procedure outlined in the following example is generally applicable to glycols having the nitro substituent on carbon atoms other than the α carbons.

EXAMPLE IV.—NITRO SUBSTITUTED DIESTERS

To prepare the diester of difluoronitroacetic acid and 2,2-dinitro-1,3-propanediol, 14.5 grams of the diol are mixed with about 27 grams of the acid. 50 grams of sulfuric acid are added dropwise to the reaction mixture as catalyst. The temperature of the reaction vessel is held below 50° C., and preferably between 30 and 50° C., because the unstable difluoronitroacetic acid begins to decompose above 50° C. The reaction is allowed to continue for about 30–40 hours while maintaining the temperature in the above range. The diester is recovered from the reaction mixture by separation, and purification by distillation as in the previous examples.

Although the above examples are for the synthesis of specific compounds, the method of synthesis is seen to be generally similar to the same classical acid catalyzed esterification reaction given in Equation 1. This method applies generally to other members of the classes from which the compounds in the examples were selected; the reactants being mixed in the same mole ratio and allowed to react under essentially the conditions set forth supra. In view of the large number of compounds within these classes which may be synthesized without departing from the spirit and scope of the present invention, I pray that my invention be limited only by the following claims.

What is claimed is:
1. As a composition of matter, a glycol diester of difluoronitroacetic acid, having the structural formula

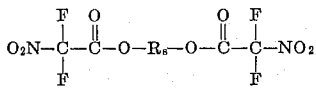

where $R_s$ is a substituted alkylene group having a chain length between 1 and 15 carbon atoms, said alkylene group having substituents selected from the group consisting of alkyl, fluoro, and nitro groups, any of the fluoro and nitro group substituents being on any carbon atom of said alkylene group other than the α carbon atoms.

2. As a composition of matter a glycol diester of difluoronitroacetic acid, having the structural formula

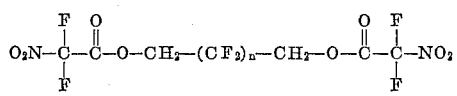

where $n$ is an integer from 1 to 5.

3. As a composition of matter, a glycol diester of difluoronitroacetic acid, having the structural formula

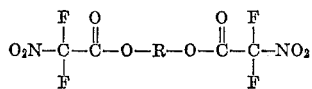

where R is an alkylene group having from 1 to 15 carbon atoms.

4. 1,2-propanediol-bis-difluoronitroacetate
5. 1,3-butanediol-bis-difluoronitroacetate
6. 2, methyl-,2-nitro,-1,3-propanediol-bis-acetate
7. 2,2-dinitro,-1,3-propanediol-bis-acetate

References Cited by the Examiner

Knunyants: Doklady Akad. Nauk S.S.S.R., vol. 112, pp. 67–69 (1957).

LORRAINE A. WEINBERGER, *Primary Examiner*.

R. K. JACKSON, *Examiner*.

A. P. HALLUIN, *Assistant Examiner*.